United States Patent [19]

Rayner

[11] Patent Number: 5,048,628
[45] Date of Patent: Sep. 17, 1991

[54] POWER ASSISTED STEERING SYSTEM

[75] Inventor: Alan Rayner, Bristol, Great Britain

[73] Assignee: TRW Cam Gears Limited, Avon, Great Britain

[21] Appl. No.: 224,999

[22] Filed: Jul. 27, 1988

[30] Foreign Application Priority Data

Aug. 7, 1987 [GB] United Kingdom ............... 8718741

[51] Int. Cl.$^5$ ............................................. B62D 5/06
[52] U.S. Cl. .................................... 180/141; 180/143; 10/468
[58] Field of Search ............... 180/143, 142, 141, 132; 60/468; 91/451, 452, 433, 421; 417/300, 302

[56] References Cited

U.S. PATENT DOCUMENTS

| | | | |
|---|---|---|---|
| 4,691,797 | 9/1987 | Miller | 140/143 |
| 4,759,419 | 7/1988 | Nagae et al. | 180/141 |
| 4,768,605 | 9/1988 | Miller et al. | 180/143 |
| 4,830,130 | 5/1989 | Rayner | 180/141 |

Primary Examiner—Andres Kashnikow
Assistant Examiner—Richard Comb
Attorney, Agent, or Firm—Tarolli, Sundheim & Covell

[57] ABSTRACT

An hydraulic fluid actuated power assisted steering system has an open center valve 4 adjustable in response to a steering input to control fluid flow to a power assistance ram 6. A by-pass valve 8 communicates between a pressure line 3 and a return line 7 of the valve 4. The by-pass valve has a control port 11 which is adjustable by a valve member 9 spring biased at 10 to normally open the control port 11 so that fluid flow from line 3 to line 7 by way of port 11 alleviates the generation of noise in the valve 4 and back pressure in the line 3. The valve member 9 is responsive to a predetermined fluid pressure differential developing between the line 3 and 7 when the valve 4 is operated so that the member 9 is displaced to close port 11 and direct greater fluid flow from pump 2 to the ram 6.

The power assistance may be speed responsive by increasing the resistance to displacement of the valve member 9 in a sense to close the port 11 by providing pistons 30 which engage the valve member 9 with a force which increases with vehicle speed, such force being provided by the application of fluid pressure to the pistons 30 from a vehicle speed responsive pump 33.

10 Claims, 3 Drawing Sheets

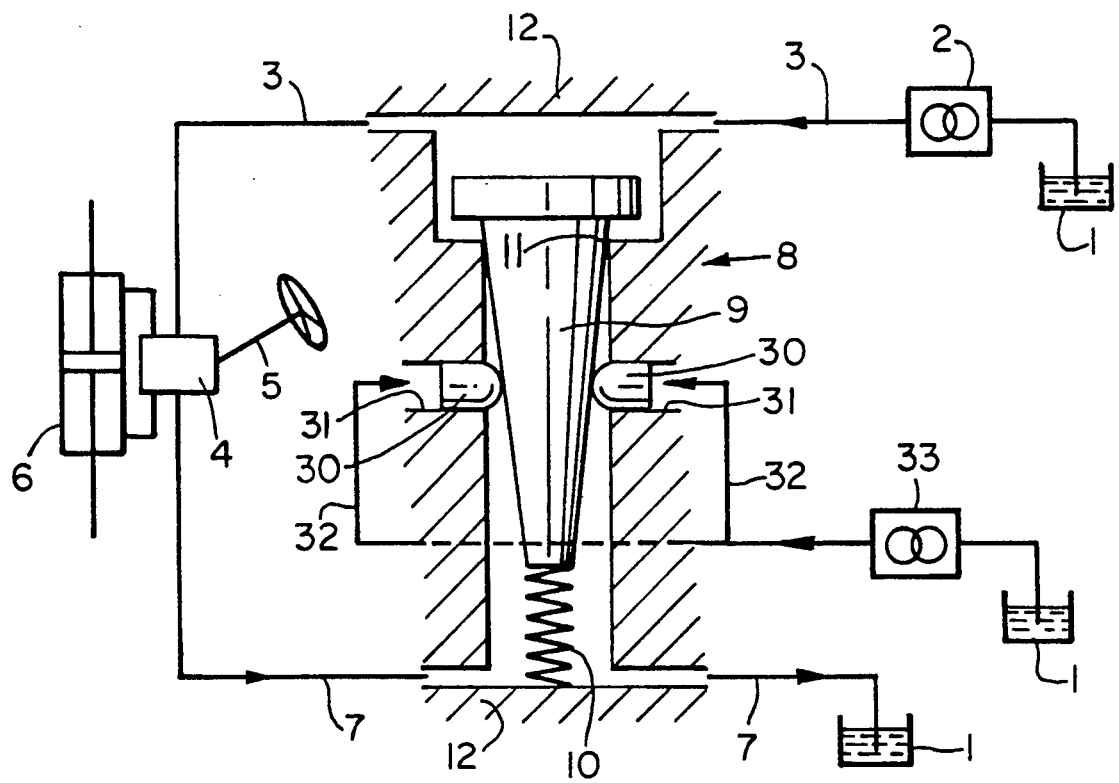

POWER ASSISTED STEERING SYSTEM

TECHNICAL FIELD & BACKGROUND ART

The present invention relates to a power assisted steering system and is particularly concerned with such a system of the hydraulic fluid actuated type having an open centre power assistance control valve which is adjustable in response to a steering input torque to control fluid flow to a servo motor in a manner which provides power assistance appropriate to the steering input. It is generally recognised that in such type steering systems, pressurised hydraulic fluid in passing through ports, recesses and over control edges in the open centre power assistance valve can generate considerable noise which, although not detrimental to the operation of the valve, is considered a nuisance; furthermore, the resistance to fluid flow through the open centre valve tends to develop a back pressure in the system which is technically undesirable, particularly due to heat which can be generated in the system. These undesirable features of noise and back pressure/heat generation are of special concern when the power assistance control valve is in its open centre condition as it will be for the major part of the period for which the system is in use and which condition is consistent with there being no change in steering (that is a steering manoeuvre is not being effected). It is an object of the present invention to provide an hydraulic fluid actuated power assisted steering system having an open centre power assistance control valve which alleviates the generation of noise and back pressure from said valve, particularly when the valve is in its open centre condition, and which system is of a relatively uncomplicated and economical construction and may lend itself to being achieved by a simple modification to existing hydraulic power assisted systems, having open centre power assistance valves.

STATEMENTS OF INVENTION & ADVANTAGES

According to the present invention there is provided an hydraulic fluid actuated power assisted steering system having an open centre power assistance valve adjustable in response to a steering input to control power assistance and a by-pass valve which communicates between a fluid pressure source for the power assistance valve and a fluid reservoir; said by-pass valve being normally open to provide fluid flow communication therethrough from the fluid pressure source to the reservoir and reacting in response to a predetermined fluid pressure differential between said fluid pressure source and the reservoir to close and reduce fluid flow therethrough from the fluid pressure source to the reservoir.

More particularly, the present invention provides an hydraulic fluid actuated power assisted steering system comprising a power assistance servo motor; an open centre power assistance control valve having a fluid outlet line communicating with a sink and a fluid pressure inlet line communicating with a fluid pressure source which provides a substantially constant volume output; said power assistance valve being adjustable in response to a steering input to control fluid flow to the servo motor to provide power assistance; a by-pass valve which communicates between the inlet and outlet lines, the by-pass valve having a control port and biasing means by which said control port is normally open to provide fluid flow communication between the inlet and outlet lines, and wherein said by-pass valve reacts against its biasing in response to the development of a predetermined fluid pressure differential when fluid pressure in the inlet line exceeds that in the outlet line and in a sense to close said control port to reduce fluid flow by way of the by-pass valve from the fluid pressure inlet line to the fluid outlet line.

By the present invention, the power assistance control valve will, when a steering manoevure is not being effected, be in its open centre condition so that fluid from the pressure source can flow, with minimum restriction presented by the open centre valve, through the open centre valve to a sink (which will usually be a reservoir). In this condition a minimum fluid pressure differential will be developed over the by-pass valve so that such valve may be opened to its maximum extent and thereby permit a proportion of the fluid flow from the fluid pressure source to pass by way of the by-pass valve to the sink or reservoir. With hydraulically actuated power assisted steering systems, the fluid pressure source will provide an output, the volume of which is constant (or substantially so). Consequently, by the present invention the volume flow of hydraulic fluid through the open centre power assistance valve when in, or in the region of, its open centre condition is reduced and thereby a reduction in noise level and back pressure can be achieved in comparison with that which would otherwise occur by the full volume output flow from the pressure source passing through the ports, recesses and over the control edges or surfaces in the open centre valve. When a steering manoevure is effected, in conventional manner the power assistance open centre valve is adjusted from its centre or neutral condition to direct fluid flow to an hydraulic ram or other form of power assistance servo motor and fluid pressure increases in the system upstream of the open centre valve. This development of fluid pressure increases the fluid pressure differential over the by-pass valve and the latter reacts (preferably against a spring or other form of biasing) to cause the by-pass valve to move towards a closed condition. As the by-pass valve progressively closes, a progressively increasing volume of fluid is directed to the power assistance control valve to actuate the servo motor. By appropriate design of the ports or orifices and control edges or surfaces in the by-pass valve, very little if any noise should be generated by fluid flow through that valve (as compared with a noise level which may otherwise be expected in the open centre valve when in its open centre condition and in the absence of the by-pass valve). Furthermore, the presence of the by-pass valve, when fully open, may be such that there is virtually no restriction to hydraulic flow through the system when a steering manoevure is not being effected so that very little back pressure or heat is likely to be generated in the system. Although it is realised that some noise may be generated in the system when a steering manoevure is being effected (for example as may be encountered during parking at low vehicle speed) and the by-pass valve may be fully closed so that full fluid flow is available from the fluid pressure source to pass through the open centre valve, such noise would be considered reasonable and tolerable for a relatively short period during which the noise is likely to occur in the overall use of the system.

In its basic arrangement, the present invention differs from a conventional hydraulically actuated power assisted steering system with an open centre power assistance control valve by the presence of the by-pass valve and as such the invention may readily be achieved by a simple and inexpensive modification to such a conventional system as may be incorporated in a vehicle.

A desirable feature of modern power assisted steering systems is that they are so-called "speed responsive" whereby the feel of the steering varies in accordance with vehicle speed so that as vehicle speed increases a greater steering input or torque is required to effect a steering manoevure (which is preferred for high speed travel) whereas maximum power assistance is required so that minimum steering input or torque is necessary when the vehicle is at low speed (for example during a parking manoevure). Such a speed responsive power assisted steering system may be provided as a further feature of the present invention by having vehicle speed responsive means which varies a resistance to actuation of the by-pass valve in accordance with variations in vehicle speed so that as vehicle speed increases, said resistance increases and as vehicle speed decreases, said resistance decreases. The by-pass valve will normally be biased to its fully open condition and this condition would be consistent with the power assistance control valve being in its open centre condition and as the fluid pressure differential develops across the by-pass valve (during the adjustment of the open centre valve from its open centre condition in a steering manoevure), the by-pass valve will be actuated and displaced against a resistance. It will be appreciated that by the aforementioned proposal, if the resistance to displacement of the by-pass valve is increased as the vehicle speed increases, then a greater fluid pressure differential is required to actuate the by-pass valve and make more fluid flow available to the power assistance control valve—consequently less fluid pressure will be available to operate the power assistance servo motor as the vehicle speed increases and, vice versa, more fluid pressure will be available to operate the power assistance servo motor as vehicle speed decreases. The vehicle speed responsive means can readily be achieved, for example hydraulically by use of an hydraulic source the pressure from which varies in proportion to vehicle speed and which is applied to the by-pass valve to increase the resistance to actuation of the valve as vehicle speed increases and vice versa, or electrically by use of a solenoid associated with the by-pass valve and which solenoid is energised in proportion to vehicle speed, again so that such energisation increases the resistance to actuation of the by-pass valve as vehicle speed increases and vice versa.

DRAWINGS

One embodiment of an hydraulically actuated power assisted steering system constructed in accordance with the present invention will now be described, by way of example only, with reference to the accompanying illustrative drawings, in which.

DETAILED DESCRIPTION OF DRAWINGS

Figure 1:
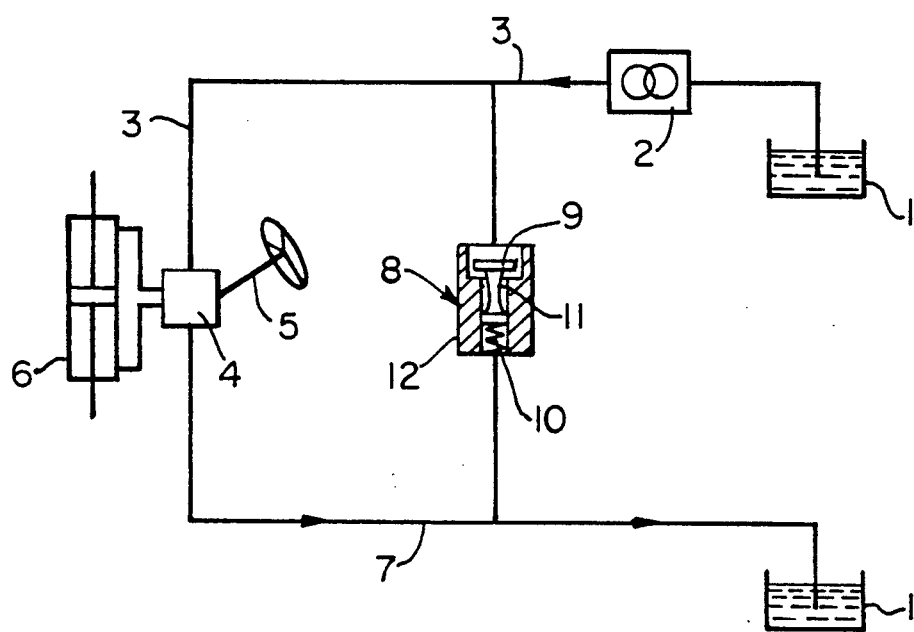
FIG. 1 is a simple diagram of the system.

The power assisted steering system shown schematically in FIG. 1 has a reservoir 1 of hydraulic fluid which supplies a constant volume output pump 2 which will usually be driven by the engine of a vehicle in which the system is installed. The output from the pump 2 is delivered by way of a fluid pressure inlet line 3 to a conventional open centre power assistance control valve 4 which is adjustable, again in conventional manner, by a steering torque applied to an input 5 to control fluid flow to a power assistance servo motor such as a double operating piston and cylinder device 6 which provides assistance to displacement of steerable vehicle wheels as appropriate. Fluid from the control valve 4 passes by way of an outlet or return line 7 to the reservoir 1. Usually the control valve 4 will be both open centre and open return whereby when that valve is in its neutral condition (which would be consistent with zero steering torque) both the fluid pressure line 3 and both pressure chambers of the piston and cylinder device 6 communicate with the return line 7.

Communicating between the pressure inlet line 3 and the return line 7 is a by-pass valve 8 having a valve member 9 which is displaceable between a fully open condition in which it permits maximum fluid to flow therethrough from the pressure line 3 to the return line 7 and a closed condition in which it permits minimum or no fluid to flow therethrough from the pressure line 3 to the return line 7. The valve member 9 is biased by a spring 10 so that the by-pass valve is normally in its fully open condition. The displacement of the valve member 9 determines the proportion of fluid which flows from the pressure line 3 to the return line 7 by way of a control port 11 in the by-pass valve so this valve may be regarded as a variable orifice or metering valve. Furthermore, the by-pass valve 8, or more particularly the displaceable valve member 9, reacts in response to the development of a predetermined fluid pressure differential between pressure in the line 3 and that in the return line 7 so that when this differential exceeds the force of the biasing spring 10, the valve member 9 can be displaced to progressively close the port 11 and thereby reduce the volume of fluid flow which can pass through the valve 8 (and thereby make a progressively increasing proportion of fluid flow available to the power assistance control valve 4).

Figure 2:
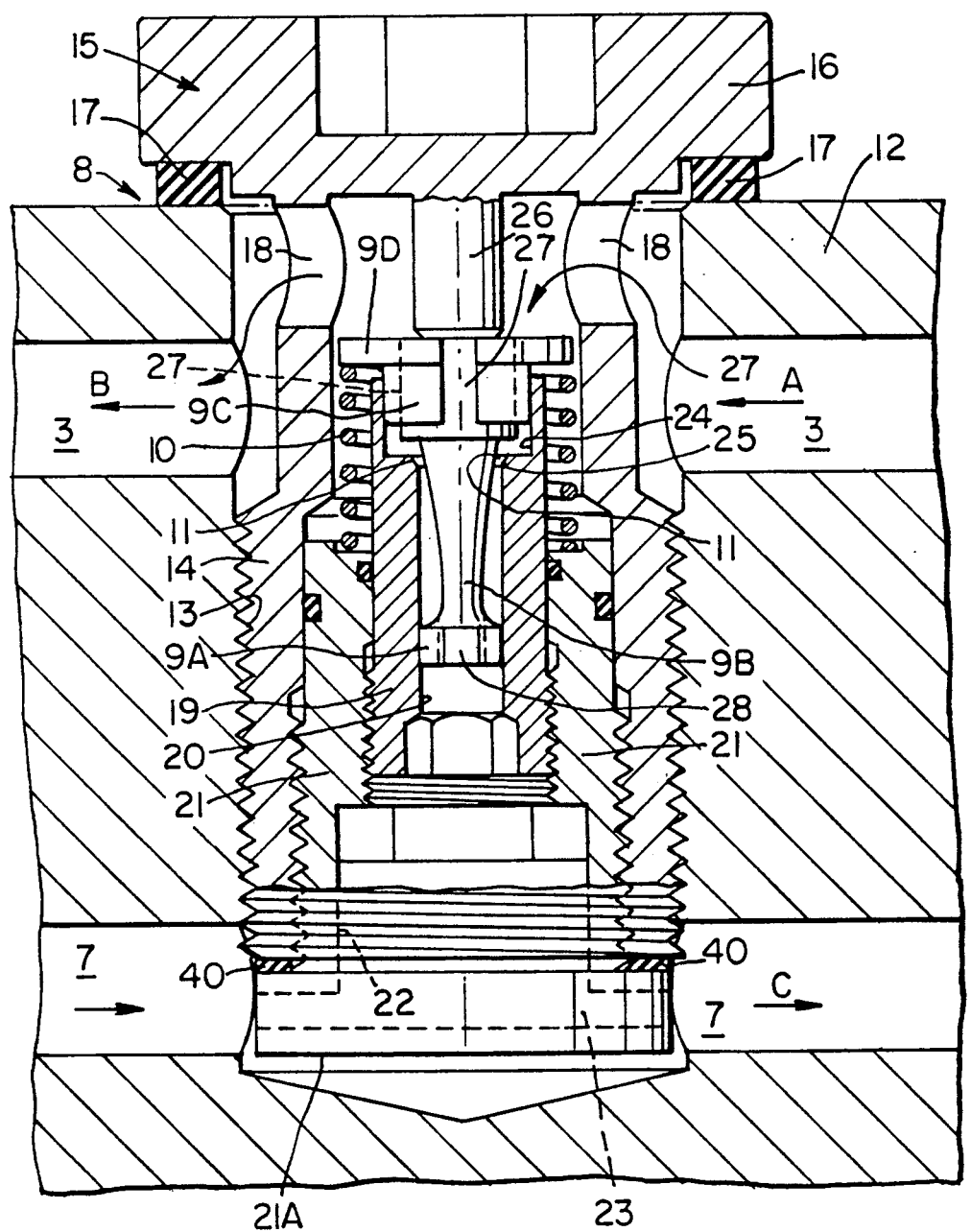
FIG. 2 is a section through the by-pass valve incorporated in the system.

The by-pass valve 8 is best seen from FIG. 2 and comprises a valve housing 12 having a threaded bore 13 with which engages a threaded tubular shank 14 of a bolt 15. The head 16 of the bolt abuts the housing 12 through a sealing washer 17. The wall of the bolt shank 14 is provided with ports 18 which communicate with the fluid pressure inlet line 3 that is coupled to the housing 12 so that fluid under pressure from the pump 2 can react within the bore of the bolt shank (the bolt 15 is generally of the type known as a "banjo bolt"). Located within and coaxial with the bore of the shank 14 is a cylindrical tubular member 19 having a cylindrical bore 20. The member 19 is externally screw threaded to engage an internally threaded tubular carrier 21. The carrier 21 is externally screw threaded to engage with an internal screw thread in the tubular shank 14. The end of the cylinder 20 remote from the bolt head 16 is in constant communication by way of a passage 22 in the tubular carrier 21 and a passage 23 in a head 21a of the carrier 21 with the return line 7 of the system which is connected to the valve housing 12.

Figure 3:
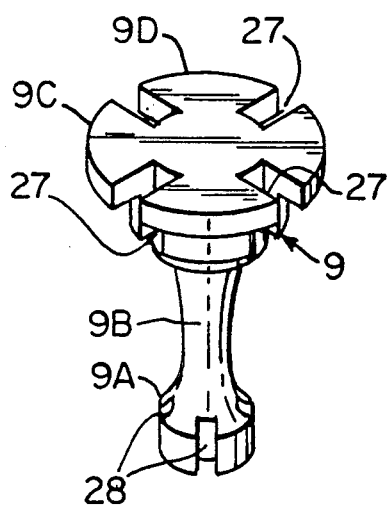
FIG. 3 is a perspective view of a valve member incorporated in the by-pass valve, and FIG. 4 diagrammatically illustrates a modification to the system of FIG. 1 by which the system is provided with vehicle speed responsive characteristics.

The valve member 9 (see FIG. 3) has a flange part 9a axially spaced by a stem part 9b from a shoulder part 9c carrying a head part 9d. The parts 9a to 9d are coaxially disposed and generally circular in radial section. The valve member 9 is located within the tubular shank of the bolt 16 so that its flange 9a is received in sliding engagement within the cylinder 20 and the shoulder 9c is received in sliding engagement within a counterbore 24 at the end of the cylinder 20 adjacent to the bolt head 16. The variable size control port 11 as previously mentioned is formed between the stem 9b and an annular metering edge 25 extending between the cylinder 20 and the counterbore 24. The valve member 9 is axially displaceable within the bolt 15 and is biased in a direction towards the bolt head 16 by the helical spring 10 which reacts between an end face of the carrier member 21 and the head 9d of the valve member. Displacement of the valve member 9 under its spring biasing is restricted by abutment of the valve head 9d on a coaxial stud 26 which projects into the bore of the bolt shank 14 from its head 16. The stem 9b of the valve member 9 is profiled to generally taper and converge in a direction from its shoulder 9c to its flange 9a so that when the valve member is at its maximum displacement under the biasing spring 10 to abut the stud 26, the control port 11 is fully opened. When the valve member 9 is displaced against its biasing, the control port 11 is progressively closed by the stem 9b so that when the valve head 9d abuts the end of the sleeve 19, the port 11 is fully closed (or is at its maximum closure). A circumferentially spaced array of axially extending slots 27 and 28 are provided in the periphery of the head 9d/shoulder 9c and flange 9a respectively to ensure that fluid flow communication can be maintained from the fluid pressure inlet line 3 to the pressurised side of the control port 11 and also from the low pressure side of the control port 11 by way of the cylinder 20 and passages 22, 23 to the return line 7.

In use of the system and with the power assistance control valve 4 in its neutral open centre condition, and with the pump 2 providing its substantially constant output, a minimum fluid pressure differential is developed over the valve member 9 between the lines 3 and 7. As a consequence the valve member 9 is displaced under its spring biasing to abut the stud 26 and the control port 11 is fully open. A major proportion of the fluid flow in the pressure line 3 can now pass by way of ports 18, slots 27, control port 11, cylinder 20, slots 28 and passages 22 and 23 to the return line 7 while a minor proportion of fluid flow passes to the open centre valve 4 and therethrough to the output line 7 to return to the reservoir 1. This reduction in fluid flow through the power assistance control valve 4 will serve to alleviate the generation of noise in that valve; furthermore, the relatively unrestricted flow of fluid from the pressure line 3 to the return line 7 alleviates the development of back pressure and thereby heat in the system as previously discussed.

When a steering input torque is applied to the valve 4 to adjust that valve from its open centre condition during a steering manoeuvre and direct fluid to the servo motor 6, pressure increases within the inlet line 3 and this increase in pressure is sensed through the ports 18 on the valve head 9d. As a consequence, a fluid pressure differential develops over axially opposite ends of the valve member 9. When this pressure differential attains a predetermined value, the valve member 9 is displaced axially against the biasing of its spring 10 to progressively close the control port 11. As this port closes, greater fluid flow is directed to the power assistance control valve 4 to actuate the servo motor. In an extreme condition, the control port 11 may be fully closed so that full volume flow and maximum pressure in the inlet line 3 is available to provide power assistance. Upon the steering manoeuvre being completed and the valve 4 returning to its open centre condition, pressure decreases in the line 3 until eventually the pressure differential between the lines 3 and 7 is such that the valve member 9 moves under its spring biasing to progressively open the control port 11 and the system reverts to the condition shown in FIG. 2.

By appropriate profiling and design of the control edge 25, valve stem 9b and fluid flow slots 27 and 28 and selection of the characteristics for the biasing spring 10, the characteristics of the by-pass valve 8 can be determined as appropriate for a particular steering system. For example by the present invention it may be possible to use a relatively inexpensive and standard power assistance valve 4 and to change the valve member 9 for another with different profiling (particularly in the region which controls fluid flow over the annular metering edge 25) to adapt the system so that it provides required power assistance steering characteristics for a particular vehicle. It is well known in power assistance steering systems for the control valve 4 to have fluid control surfaces and edges which are especially profiled to suit a particular vehicle, for example as proposed in EP-0196172, so that these control valves (which are considered expensive components of the system) are generally suitable to meet the required steering characteristics of one particular vehicle. By the present invention the control valve 4 may be regarded as standard and suitable for a wide range of vehicle steering systems while the valve member 9 may be interchangeable with other such members in a relatively simple and inexpensive manner to provide the power assistance characteristics which may be considered appropriate for a particular vehicle.

From the aforegoing it will be realised that as the control port 11 closes in response to an increasing fluid pressure differential between high pressure fluid in the line 3 and low pressure fluid in the line 7, an increasing proportion of fluid flow is directed to the servo motor 6 so that increasing power assistance is provided. In the embodiment so far described, the resistance to axial displacement of the valve member 9 to close the control port 11 may be considered as comprising the sliding friction of the control valve in its cylinder and the resistance of the spring 10. However, if the resistance to displacement of the valve member varies in accordance with the speed of the vehicle so that as the vehicle speed increases there is a greater resistance to the valve member 9 closing the port 11 (and thereby less fluid is available to actuate the servo motor 6 and thereby a reduced power assistance is provided) and vice versa as vehicle speed decreases there is less resistance to displacement of the valve member 9 to close the port 11 (so that greater fluid flow is available to actuate the servo motor 6 as vehicle speed decreases), then the steering system will be speed responsive. Such a speed responsive system is schematically illustrated in FIG. 4 which shows a modification of the general system previously discussed. In FIG. 4 diametrically opposed pistons 30 are slidably disposed in cylinders 31 in the valve housing 12 (or in the shank 14 of the bolt 15). The cylinders 31 extend radially relative to the axis of the valve member 9 and communicate by way of pressure lines 32 with a variable pressure pump 33. The output pressure from the pump 33 varies in accordance with the speed of the vehicle so that such pressure increases as vehicle speed increases and decreases as vehicle speed decreases. With the pump 33 operative, the pistons 30 are subjected to fluid pressure which acts to displace those pistons radially inwardly and into abutment withd the valve member 9. As pressure in the lines 32 increases with vehicle speed, the pistons 30 are urged with greater force into engagement with the valve member 9. It will be seen from the Figure that the abutment of the pistons 30 with the valve member 9 will resist displacement of the valve member in a sense to close the control port 11. Consequently when the vehicle is at low speed, negligible fluid pressure will be available from the pump 33 so that negligible resistance is provided by the pistons 30 to displacement of the valve member 9 and the system operates substantially as previously described with reference to FIG. 2 (and maximum power assistance is readily available for the servo motor to assist in low speed manoeuvring). However, as vehicle speed increases and, say, at maximum vehicle speed, the pump 33 provides high pressure in the cylinders 31 so that the pistons 30 are urged with maximum force into abutment with the valve member 9. Thus there is maximum resistance to displacement of the valve member 9 in a sense to close the port 11, possibly so that the control port is maintained open to a substantial extent; as a result a major proportion of the fluid flow from the pressure line 3 can by-pass the power assistance control valve 4 by way of the by-pass valve 8 and the relatively small amount of fluid flow which may be available to actuate the servo motor 6 will provide a minimum of power assistance and thereby maximum feel to a steering manoeuvre as is considered desirable for manoeuvring at high vehicle speed.

Basically the system shown in FIG. 1 differs from conventional hydraulic power assisted steering systems with open centre valves by the provision of the by-pass valve 8 (and possibly the provision of that valve with a vehicle speed responsive facility to vary the resistance to the reaction of the by-pass valve as shown in FIG. 4), as such the system of the invention may be applied to existing power assisted steering systems with relatively simple and inexpensive vehicle modification.

It will be seen from FIG. 2 that the tubular carrier 21 screws into the end of the bolt shank 14 so that the head 21a of the carrier 21 abuts the end of the bolt shank. Preferably this latter abutment is through an annular spacer or seal 40. By changing the spacer 40 for one of a different axial thickness it will be apparent that the metering edge 25 of the control port 11 will be displaced axially towards or from the stud 26—thereby an adjustment in the spacing as aforementioned can serve to adjust the fully open size of the control port 11 (when the valve member 9 abuts the stud 26) as may be required to provide appropriate power assistance characteristics for a particular vehicle.

I claim:

1. An hydraulic fluid actuated power assisted steering system having an open centre power assistance valve adjustable in response to a steering input to control power assistance and a by-pass valve which communicates between a fluid pressure source for the power assistance valve and a fluid reservoir; said by-pass valve being biased open to provide fluid flow communication therethrough from the fluid pressure source to the reservoir and reacting in response to a predetermined fluid pressure differential between said fluid pressure source and the reservoir to close and reduce fluid flow therethrough from the fluid pressure source to the reservoir.

2. A system as claimed in claim 1 and comprising vehicle speed responsive means which varies a resistance to actuation of the by-pass valve in accordance with variations in vehicle speed so that as vehicle speed increases said resistance increases and as vehicle speed decreases said resistance decreases.

3. A system as claimed in claim 1 in which the by-pass valve comprises a biased valve member which is displaceable in response to said predetermined fluid pressure differential and against its biasing to progressively close a control port through which fluid can flow from the fluid pressure source to the reservoir.

4. An hydraulic fluid actuated power assisted steering system having an open center power assistance valve adjustable in response to a steering input to control power assistance and a bypass valve which communicates between a fluid pressure source for the power assistance valve and a fluid reservoir; said bypass valve being normally open to provide flow communication therethrough from the fluid pressure source to the reservoir and reacting in response to a predetermined fluid pressure differential between said fluid pressure source and the reservoir to close and reduce fluid flow therethrough from the fluid pressure source to the reservoir; said bypass valve comprising a biased valve member which is displaceable in response to said predetermined fluid pressure differential and against its biasing to progressively close a control port through which fluid can flow from the fluid pressure source to the reservoir, said valve member being restricted by an abutment to a position of displacement under its biasing to a condition corresponding to a fully open condition of the control port.

5. A system as claimed in claim 4 in which said restricted displacement of the valve member under its biasing is adjustable to change the fully open condition of the control port.

6. An hydraulic fluid actuated power assisted steering system having an open center power assistance valve adjustable in response to a steering input to control power assistance and a bypass valve which communicates between a fluid pressure source for the power assistance valve and a fluid reservoir; said bypass valve being normally open to provide fluid flow communication therethrough from the fluid pressure source to the reservoir and reacting in response to a predetermined fluid pressure differential between said fluid pressure source and the reservoir to close and reduce fluid flow therethrough from the fluid pressure source to the reservoir; said bypass valve comprising a biased valve member which is displaceable in response to said predetermined fluid pressure differential and against its biasing to progressively close a control port through which fluid can flow from the fluid pressure source to the reservoir, said valve member being displaceable in a tubular shanked bolt located in a housing, said tubular shanked bolt having a port which communicates with the fluid pressure source, the open center power assistance valve and the valve member on a pressurized side of the control port and having passage means which communicate with the reservoir on the low pressure side of the control port.

7. A system as claimed in claim 6 in which the valve member is axially displaceable in a carrier member in the tubular shank which carrier member has a metering edge that forms, with the valve member, the control port and wherein said valve member is biased axially into abutment with the bolt and said carrier member is adjustable axially relative to the bolt to change the size of the control port when the valve member abuts the bolt.

8. A hydraulic fluid actuated power assisted steering system having an open center power assistance valve adjustable in response to a steering input to control power assistance; a by-pass valve which communicates between a fluid pressure source for the power assistance valve and a fluid reservoir; said by-pass valve being normally open to provide fluid flow communication therethrough from the fluid pressure source to the reservoir and reacting in response to a predetermined fluid pressure differential between said fluid pressure source and the reservoir to close and reduce fluid flow therethrough from the fluid pressure source to the reservoir; and vehicle speed responsive means which varies a resistance to actuation of the by-pass valve in accordance with variations in vehicle speed so that as vehicle speed increases said resistance increases and as vehicle speed decreases said resistance decreases; said vehicle speed responsive means being hydraulically actuated and comprising a pump, hydraulic pressure from which varies in accordance with vehicle speed and said variations in hydraulic pressure being applied to the by-pass valve to vary said resistance to its actuation.

9. A hydraulic fluid actuated power assisted steering system having an open center power assistance valve adjustable in response to a steering input to control power assistance; a by-pass valve which communicates between a fluid pressure source for the power assistance valve and a fluid reservoir; said by-pass valve being normally open to provide fluid flow communication therethrough from the fluid pressure source to the reservoir and reacting in response to a predetermined fluid pressure differential between said fluid pressure source and the reservoir to close and reduce fluid flow therethrough from the fluid pressure source to the reservoir; and vehicle speed responsive means which varies a resistance to actuation of the by-pass valve in accordance with variations in vehicle speed so that as vehicle speed increases said resistance increases and as vehicle speed decreases said resistance decreases; said vehicle speed responsive means being electrically actuated and comprising an electrical solenoid which is energized to an extent which varies in accordance with vehicle speed and said energization of the solenoid being applied to the by-pass valve to vary said resistance to its actuation.

10. A hydraulic fluid actuated power assisted steering system, said system comprising:
an open center power assistance valve adjustable in response to a steering input to control power assistance;
a by-pass valve which provides fluid communication between a fluid pressure source for the power assistance valve and a fluid reservoir, said by-pass valve being normally open to provide fluid flow communication therethrough from the fluid pressure source to the reservoir, said by-pass valve reacting in response to a predetermined fluid pressure differential between said fluid pressure source and the reservoir to close and reduce fluid flow therethrough from the fluid pressure source to the reservoir; and
vehicle speed responsive means for varying a resistance to actuation of said by-pass valve, said vehicle speed responsive means being responsive to variations in vehicle speed such that as the vehicle speed increases the resistance increases for the by-pass valve to close and as vehicle speed decreases the resistance decreases for the by-pass valve to close.

* * * * *

UNITED STATES PATENT AND TRADEMARK OFFICE
CERTIFICATE OF CORRECTION

PATENT NO. : 5,048,628

DATED : September 17, 1991

INVENTOR(S) : Alan Rayner

It is certified that error appears in the above-identified patent and that said Letters Patent is hereby corrected as shown below:

```
Column 7, Line 57, Claim 1, change "an" to --a--.

Line 58, Claim 1, change "centre"
              to --center--.

Column 8, Line 13, Claim 4, change "an" to --a--.

Line 19, Claim 4, insert --fluid--
              after "provide".

Line 38, Claim 6, change "an" to --a--.
```

Signed and Sealed this

Ninth Day of February, 1993

*Attest:*

STEPHEN G. KUNIN

*Attesting Officer*     *Acting Commissioner of Patents and Trademarks*